(12) United States Patent
Boyle et al.

(10) Patent No.: US 6,851,055 B1
(45) Date of Patent: Feb. 1, 2005

(54) DIGITAL VIDEO RECORDER FOR ENCRYPTING/DECRYPTING VIDEO PROGRAMS IN SEGMENTS TO FACILITATE TRICK PLAY FEATURES

(75) Inventors: William B. Boyle, Lake Forest, CA (US); Alan P. Rice, Santa Ana, CA (US)

(73) Assignees: Keen Personal Technologies, Inc., Lake Forest, CA (US); Keen Personal Media, Inc., Lake Forest, CA (US)

( * ) Notice: Subject to any disclaimer, the term of this patent is extended or adjusted under 35 U.S.C. 154(b) by 894 days.

(21) Appl. No.: 09/676,637

(22) Filed: Sep. 30, 2000

(51) Int. Cl.$^7$ .................................................. H04L 1/24
(52) U.S. Cl. ...................... 713/193; 713/187; 713/200; 713/201
(58) Field of Search ............................... 713/193, 187, 713/200, 201, 165

(56) References Cited

U.S. PATENT DOCUMENTS

| | | | |
|---|---|---|---|
| 5,488,409 A | * 1/1996 | Yuen et al. | ..................... 725/41 |
| 5,592,555 A | 1/1997 | Stewart | |
| 5,687,237 A | 11/1997 | Naclerio | |
| 5,761,607 A | * 6/1998 | Gudesen | ...................... 725/89 |
| 5,931,947 A | 8/1999 | Burns et al. | |

FOREIGN PATENT DOCUMENTS

WO     WO 97-43761     11/1997

OTHER PUBLICATIONS

Bennet Yee, J.D. Tygar, "Secure Coprocessors in Electronic Commerce Applications", First USENIX Workshop on Electronic Commerce, Jul. 11–12, 1995, 155–170.

Howard Gobioff, "Security for a High Performance Commodity Storage Subsystem", School of Computer Science, Carnegie Mellon University, CMU–CS–99–160, Jul. 1999, pp. 171–178.

Rodney Van Meter, Steve Hotz, Gregory Finn, "Derived Virtual Devices: A Secure Distributed File System Mechanism", In Proceedings of the Fifth NASA Goddard Space Flight Center Conference on Mass Storage Systems and Technologies, Sep. 1996.

Garth A. Gibson, David F. Nagle, Khalil Amiri, Fay W. Chang, Howard Gobioff, Erik Riedel, David Rochberg, and Jim Zelenka, "Filesystems for Network–Attached Secure Disks", Jul. 1997, 1–18, CMU–CS–97–118, School of Computer Science, Carnegie Mellon University, Pittsburgh, Pennsylvania.

Howard Gobioff, Garth Gibson, and Doug Tygar, "Security for Network Attached Storage Devices", Oct. 23, 1997, 1–18 CMU–CS–97–185, School of Computer Science, Carnegie Mellon University, Pittsburgh, PA 15213.

"Digital Transmission License Agreement", www.dtcp.com.

"Digital Transmission Content Protection Specification", vol. 1, Revision 1.0, Apr. 12, 1999, www.dtcp.com.

"5C Digital Transmission Content Protection White Paper", Revision 1.0, Jul. 14, 1998, www.dtcp.com.

Steve Grossman, "Two–Chip Set Safeguards Digital Video Content", Electronic Design, Jun. 12, 2000, pp. 68–72.

\* cited by examiner

*Primary Examiner*—Thomas R. Peeso
(74) *Attorney, Agent, or Firm*—Milad G. Shara, Esq.; Howard H. Sheerin, Esq.

(57) ABSTRACT

A digital video recorder (DVR) is disclosed for storing a plaintext video program as an encrypted video program. The DVR comprises a random access storage (RAS) device for storing the encrypted video program in encrypted segments. The DVR further comprises a cryptography facility comprising an encoder for encrypting plaintext segments of the plaintext video program into the encrypted segments stored on the RAS device, and a decoder for randomly and independently decrypting the encrypted segments of the encrypted video program into plaintext segments during playback.

14 Claims, 7 Drawing Sheets

DIGITAL VIDEO RECORDER FOR ENCRYPTING/DECRYPTING VIDEO PROGRAMS IN SEGMENTS TO FACILITATE TRICK PLAY FEATURES

BACKGROUND OF THE INVENTION

1. Field of the Invention

The present invention relates to digital video recorders. More particularly, the present invention relates to a digital video recorder for encrypting/decrypting video programs in segments to facilitate trick play features.

2. Description of the Prior Art

Digital video recorders (DVRs) typically store video programs on a random access storage (RAS) device, such as on a conventional hard disk drive (HDD), which enables certain "trick play" features, such as skipping ahead in a program. The trick play features are enabled by processing frame headers which are recorded in arbitrary length frames of the video program. Due to the arbitrary frame lengths, the video programs are typically processed in unencrypted form in order to detect frame headers which identify frame boundaries. Thus, prior art DVRs typically store copyrighted video programs in unencrypted form so that the DVR can randomly access individual frames during playback. This design, however, subjects the copyrighted material to unauthorized reproduction, for example, by eavesdropping while the copyrighted content is transferred from the DVR host circuitry to the RAS device.

Prior art DVRs typically employ a conventional hard disk drive (HDD), such as an IDE hard disk drive, as the RAS device since HDDs have sufficient capacity to store video content and are relatively inexpensive due to their prevalent use in personal computers (PCs). Rather than design and manufacture a customized HDD for the DVR market, DVRs are constructed similar to a PC, including DVR host circuitry for interfacing with a commodity HDD which reduces the cost of the DVR. Using a conventional HDD, however, has rendered the DVR more susceptible to unauthorized copying of video programs since the HDD can be removed and installed in another DVR or in a PC.

There is, therefore, a need to protect against unauthorized reproduction of copyrighted video programs in a DVR employing a cost effective, commodity HDD, while supporting trick play features.

SUMMARY OF THE INVENTION

The present invention may be regarded as a digital video recorder (DVR) for storing a plaintext video program as an encrypted video program. The DVR comprises a random access storage (RAS) device for storing the encrypted video program in encrypted segments. The DVR further comprises a cryptography facility comprising an encoder for encrypting plaintext segments of the plaintext video program into the encrypted segments stored on the RAS device, and a decoder for randomly and independently decrypting the encrypted segments of the encrypted video program into plaintext segments during playback.

In one embodiment the cryptography facility comprises a pseudo-random sequence generator for generating a pseudo-random sequence. In one embodiment, the pseudo-random sequence generator is initialized with segment seed values corresponding to the plaintext segments of the plaintext video program, and the encoder combines the pseudo-random sequence generated for each segment seed value with the plaintext segments of the plaintext video program to generate the encrypted segments of the encrypted video program stored on the RAS device. During playback, the pseudo-random sequence generator is initialized with segment seed values corresponding to the encrypted segments of the encrypted video program, and the decoder combines the pseudo-random sequence generated for each segment seed value with the encrypted segments of the encrypted video program to generate the plaintext segments of the plaintext video program.

In an alternative embodiment, the RAS device comprises a hard disk drive (DD) comprising a disk, the disk comprises a plurality of data tracks, each track comprises a plurality of data sectors, and each data sector stores an encrypted segment of the encrypted video program.

The present invention may also be regarded as a method for processing a video program in a digital video recorder comprising a random access storage (RAS) device. Plaintext segments of a plaintext video program are encrypted into encrypted segments. The encrypted segments are stored on the RAS device and, during playback, randomly read from the RAS device. Each encrypted segment is then independently decrypted into a plaintext segment

DESCRIPTION OF THE PREFERRED EMBODIMENTS

Figure 1:
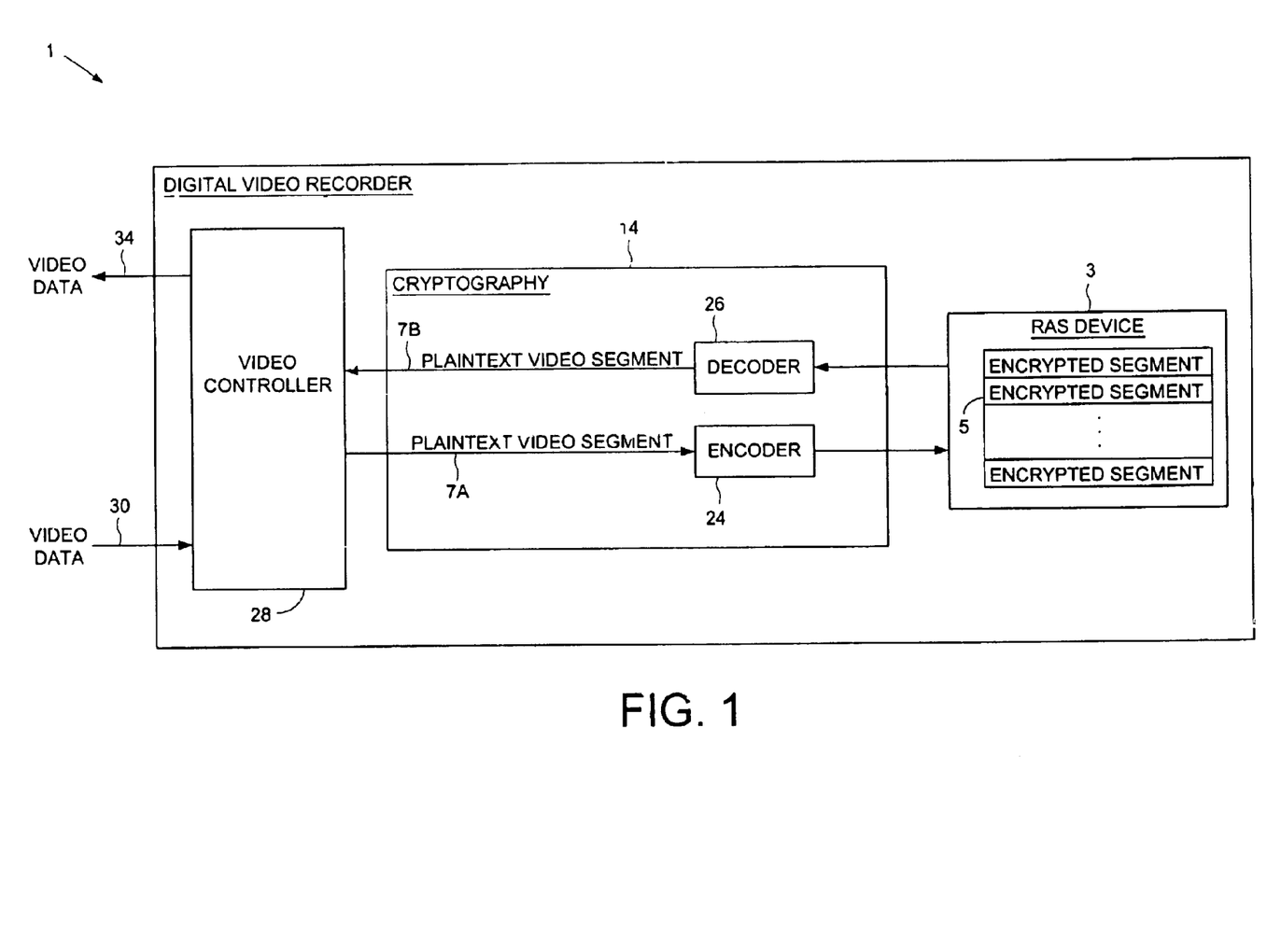
FIG. 1 shows a digital video recorder according to an embodiment of the present invention wherein a video program is encrypted in segments, and the encrypted segments stored on a random access storage device.

FIG. 1 shows a digital video recorder (DVR) 1 for storing a plaintext video program as an encrypted video program according to an embodiment of the present invention. The DVR 1 comprises a random access storage (RAS) device 3 for storing the encrypted video program in encrypted segments 5. The DVR 1 further comprises a cryptography facility 14 comprising an encoder 24 for encrypting plaintext segments 7A of the plaintext video program into the encrypted segments 5 stored on the RAS device 3, and a decoder 26 for randomly and independently decrypting the encrypted segments 5 of the encrypted video program into plaintext segments 7B during playback.

The DVR 1 of FIG. 1 further comprises a video controller 28 for receiving video data 30 from an external entity (e.g., a cable or satellite) and for providing video data 34 to a display device during playback. The video controller 28 processes the headers in the video frames of the video data 30 in order to implement trick play features. Certain trick play features, such as skip ahead or behind, require that the video program be accessed randomly rather than in a consecutive sequence of frames. The DVR 1 of FIG. 1 facilitates this feature by decrypting the video program in segments. When the video controller 28 requires access to a particular segment of the video program, it initializes the decoder 26 with an appropriate segment key for decrypting the video-segment as it is read from the RAS device 3.

Figure 2:
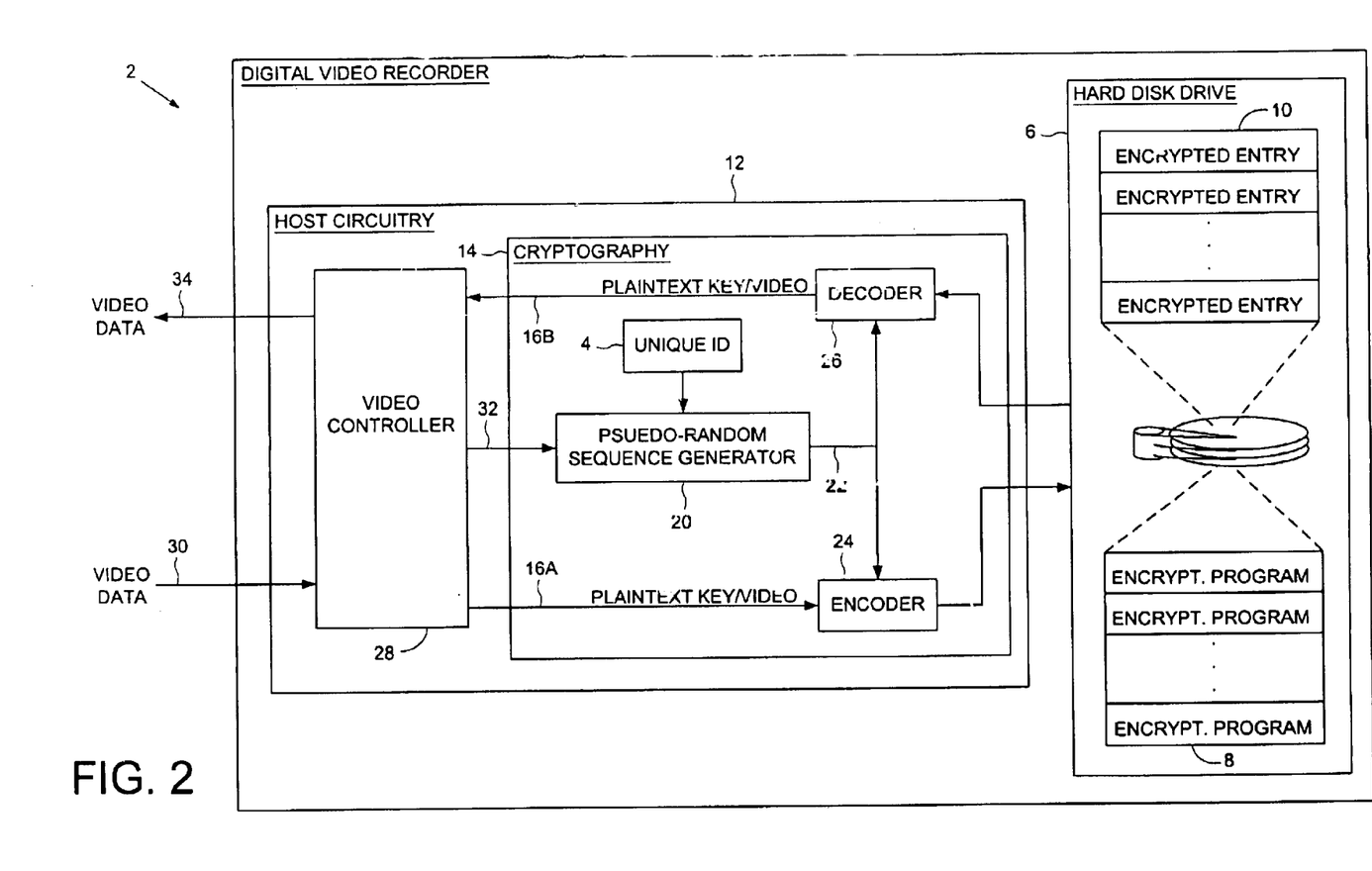
FIG. 2 shows a digital video recorder according to an alternative embodiment of the present invention wherein video programs are stored in encrypted form on a hard disk drive (HDD) using plaintext keys which are also encrypted using a pseudo-random sequence generated from a unique ID and stored in encrypted file system entries on the HDD.

FIG. 2 shows a DVR 2 according to an embodiment of the present invention wherein the RAS device 3 of FIG. 1 is implemented as a hard disk drive (HDD) 6. The HDD 6 stores a plurality of encrypted video programs 8 and an encrypted file system, the encrypted file system comprising a plurality of encrypted file system entries 10 for decrypting the plurality of encrypted video programs 8. The DVR 2 further comprises host circuitry 12 for interfacing with the HDD 6, the host circuitry 12 comprising the cryptography facility 14 for encrypting plaintext file system entries 16A into the encrypted file system entries 10 stored on the HDD 6, and for decrypting the encrypted file system entries 10 read from the HDD 6 into plaintext file system entries 16B. The cryptography facility 14 comprises a pseudo-random sequence generator 20, responsive to the unique ID 4, for generating a pseudo-random sequence 22. The cryptography facility 14 further comprises an encoder 24 for combining the pseudo-random sequence 22 with the plaintext file system entries 16A to generate the encrypted file system entries 10 stored on the HDD 6, and a decoder 26 for combining the pseudo-random sequence 22 with the encrypted file system entries 10 read from the HDD 6 to generate the plaintext file system entries 16B.

In one embodiment, the encoder 24 of FIG. 2 performs the encryption operation by XORing each element (e.g., byte) of the plaintext file system entry 16A with a corresponding element (e.g., byte) of the pseudo-random sequence 22. Similarly, the decoder 26 performs the decryption operation by XORing each element (e.g., byte) of the encrypted file system entry 10 with a corresponding element (e.g., byte) of the pseudo-random sequence 22 to generate the plaintext file system entry 16B.

The video controller 28 generates control signals 32 for controlling the operation of the cryptography facility 14 when recording an encrypted video program 8, together with the encrypted file system entry 10 for decrypting the encrypted video program 8. The video controller also processes the decrypted file system entries 16B so that the encrypted video programs 8 can be decrypted and output as video data 34 to a display device. Because the file system entries 10 are stored in encrypted form relative to the unique ID 4 assigned to the DVR 2, the encrypted video programs 8 stored on the HDD 6 cannot be decrypted by connecting the HDD 6 to another DVR or to a PC. In effect, the HDD 6 is married to the host circuitry 12 of the DVR 2 through the unique ID 4 which protects against unauthorized copying. In addition, the encrypted file system entries 10 are transparent to the operation of the HDD 6 so that any conventional HDD 6 may be employed without modification.

In one embodiment, the plaintext file system entry 16A comprises a plaintext key for encrypting a plaintext video program into an encrypted video program 8 stored on the HDD 6. The cryptography facility 14 encrypts the plaintext video program into an encrypted video program 8 stored on the HDD 6, and encrypts the plaintext key into an encrypted key stored on the HDD 6 in an encrypted file system entry 10. In one embodiment, the encoder 24 combines the pseudo-random sequence 22 with the plaintext video program to generate the encrypted video program 8 stored on the HDD 6.

In another embodiment, the encrypted file system entry 10 comprises an encrypted key for decrypting an encrypted video program 8 read from the HDD 6 into a plaintext video program. The cryptography facility 14 decrypts the encrypted key read from encrypted file system entry 10 into a plaintext key, and decrypts the encrypted video program 8 read from the HDD 6 using the plaintext key. In one embodiment, the decoder 26 combines the pseudo-random sequence 22 with the encrypted video program 8 read from the HDD 6 to generate the plaintext video program.

In one embodiment, the pseudo-random sequence generator 20 comprises a programmable file system (FS) polynomial for generating the pseudo-random sequence 22. In one embodiment, the programmable FS polynomial is programmed with coefficients which, in one embodiment, are generated by a coefficient generator responsive to the unique ID 4. In another embodiment, the programmable FS polynomial is programmed with a seed value which, in one embodiment, is generated by a seed value generator responsive to the unique ID 4.

Figure 3A:
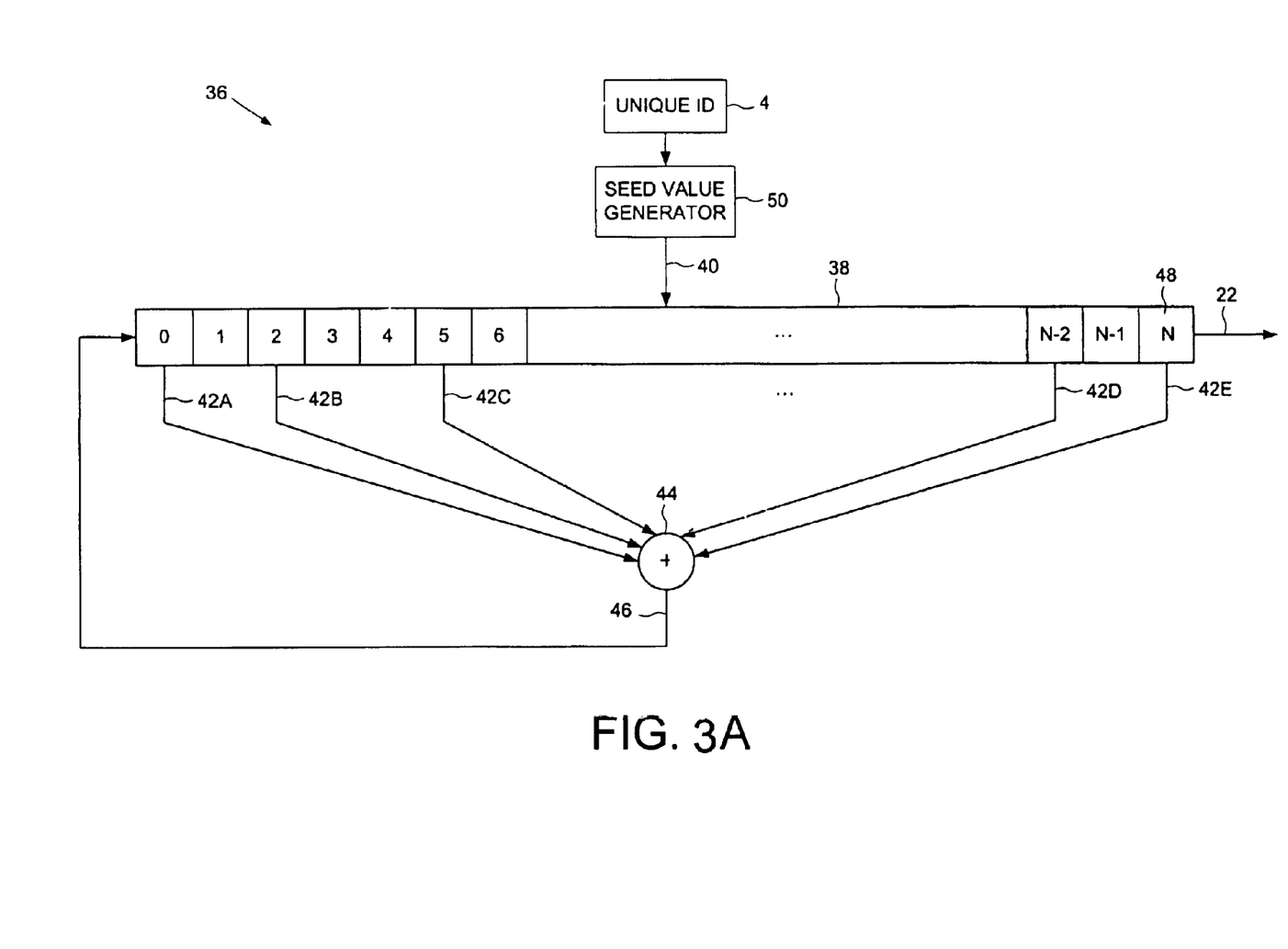
FIG. 3A shows a programmable file system (FS) polynomial implemented using a linear feedback shift register (LFSR) for generating the pseudo-random sequence of FIG. 2, wherein a seed value is generated for the LFSR from the unique ID.

FIG. 3A shows an embodiment of the present invention wherein the FS polynomial is implemented using a suitable linear feedback register (LFSR) 36. An LFSR may be implemented using a number of different configurations. The LFSR 36 of FIG. 3A comprises a shift register 38 comprising N storage elements which are initialized with a seed value 40 generated by a seed value generator 50 from the unique ID 4. A number of taps 42A–42E connect a corresponding number of the storage elements to an adder 44 for adding the values stored in the storage elements. The resulting sum 44 is fed back 46 to an input of the LFSR 36. The LFSR 36 is shifted from left to right, and the right most storage element 48 outputs each value of the pseudo-random sequence 22.

Figure 3B:
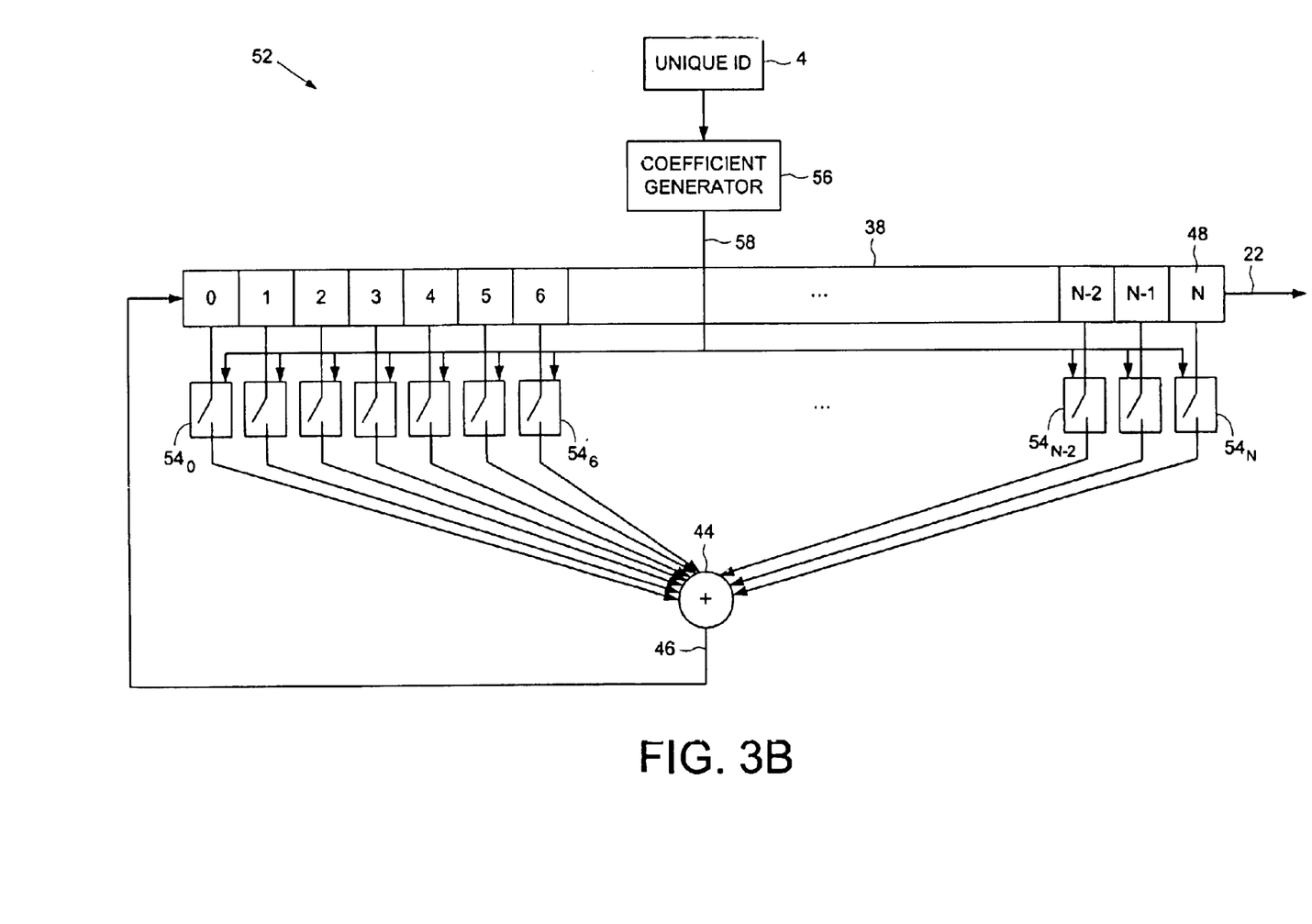
FIG. 3B shows a programmable FS polynomial implemented using a LFSR for generating the pseudo-random sequence of FIG. 2, wherein coefficient values are generated for the LFSR from the unique ID.

FIG. 3B shows an alternative embodiment of the present invention wherein the FS polynomial is implemented using an LFSR 52 comprising programmable coefficients $54_0$–$54_N$. A coefficient generator 56 generates coefficient values 58 for programming each of the programmable coefficients $54_0$–$54_N$. In the embodiment shown in FIG. 3B, the coefficients are binary valued and the programmable coefficients $54_0$–$54_N$ are implemented as switches.

In yet another embodiment of the present invention, the FS polynomial is implemented using an LFSR comprising both a programmable seed value and programmable coefficients values which are generated from the unique ID 4.

In one embodiment, the seed value generator 50 implements a function f(x), such as a polynomial, with the unique ID 4 as the input argument x and the seed value 40 the result. In another embodiment, the seed value generator 50 comprises a programmable algorithm for computing the seed value 40 from the unique ID 4. This embodiment allows a DVR manufacture to select the function f(x) for implementing a line of DVRs. This embodiment also allows an external entity to update the programmable algorithm to protect against system compromise. For example, in one embodiment the DVR 2 of FIG. 2 comprises network circuitry for connecting to a network (e.g., through a cable or satellite), and a system administrator on the network periodically changes the programmable algorithm in a random manner. Thus, if an attacker discovers the algorithm used by the seed value generator 50 to generate the seed value 40, the compromise is only temporary until the system administrator updates the algorithm.

In another embodiment, the coefficient value generator 56 implements a plurality of functions f(x), such as a plurality of polynomials, with the unique ID as the input argument x and the coefficient values 58 the result of each function f(x). The coefficient value generator 56 may also implement a programmable algorithm for computing the coefficient values 58 to facilitate different DVR manufactures and to protect against system compromise as described above.

In another embodiment of the present invention, the seed value generator 50 comprises a seed table comprising a plurality of table entries, each table entry comprising a seed value. An index generator, responsive to the unique ID 4, generates an index into the seed table. In yet another embodiment, the coefficient value generator 56 comprises a coefficient table comprising a plurality of table entries, each table entry comprising coefficient values. An index generator, responsive to the unique ID 4, generates an index into the coefficient table.

Figure 4A:
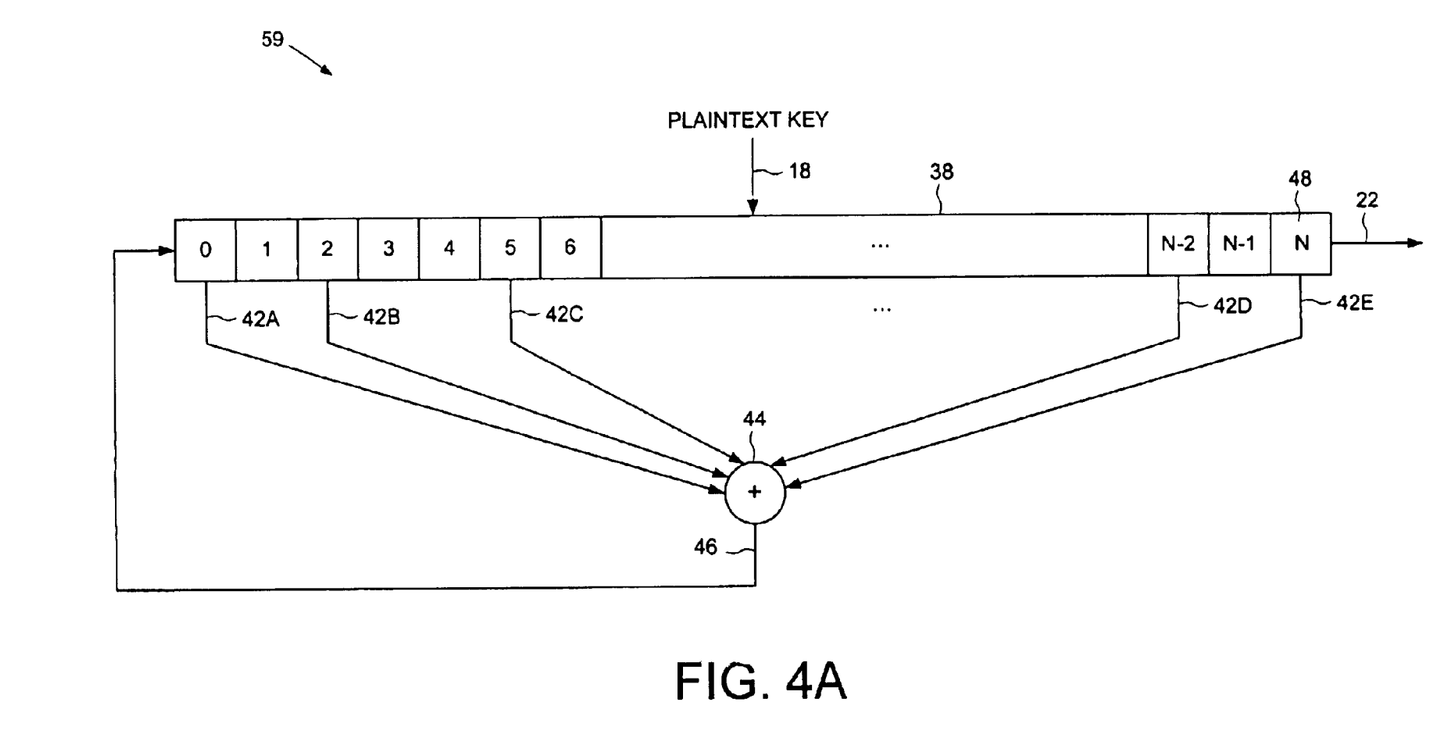
FIG. 4A shows an LFSR for generating a pseudo-random sequence for encrypting a plaintext video program using a plaintext key as a seed value for the LFSR.

FIG. 4A shows an alternative embodiment of the present invention as comprising a programmable LFSR 59 for generating a pseudo-random sequence 22 used to encrypt a plaintext video program into an encrypted video program 8 stored on the HDD 6. A plaintext key 18 is used as a seed value for the LFSR 59, where the plaintext key 18 is associated with the plaintext video program. In one embodiment, the plaintext key is derived from the filename or other attribute of the video program. In another embodiment, the plaintext key is generated randomly using any suitable method, for example, by reading a system clock value just prior to encrypting the plaintext video.

Figure 4B:
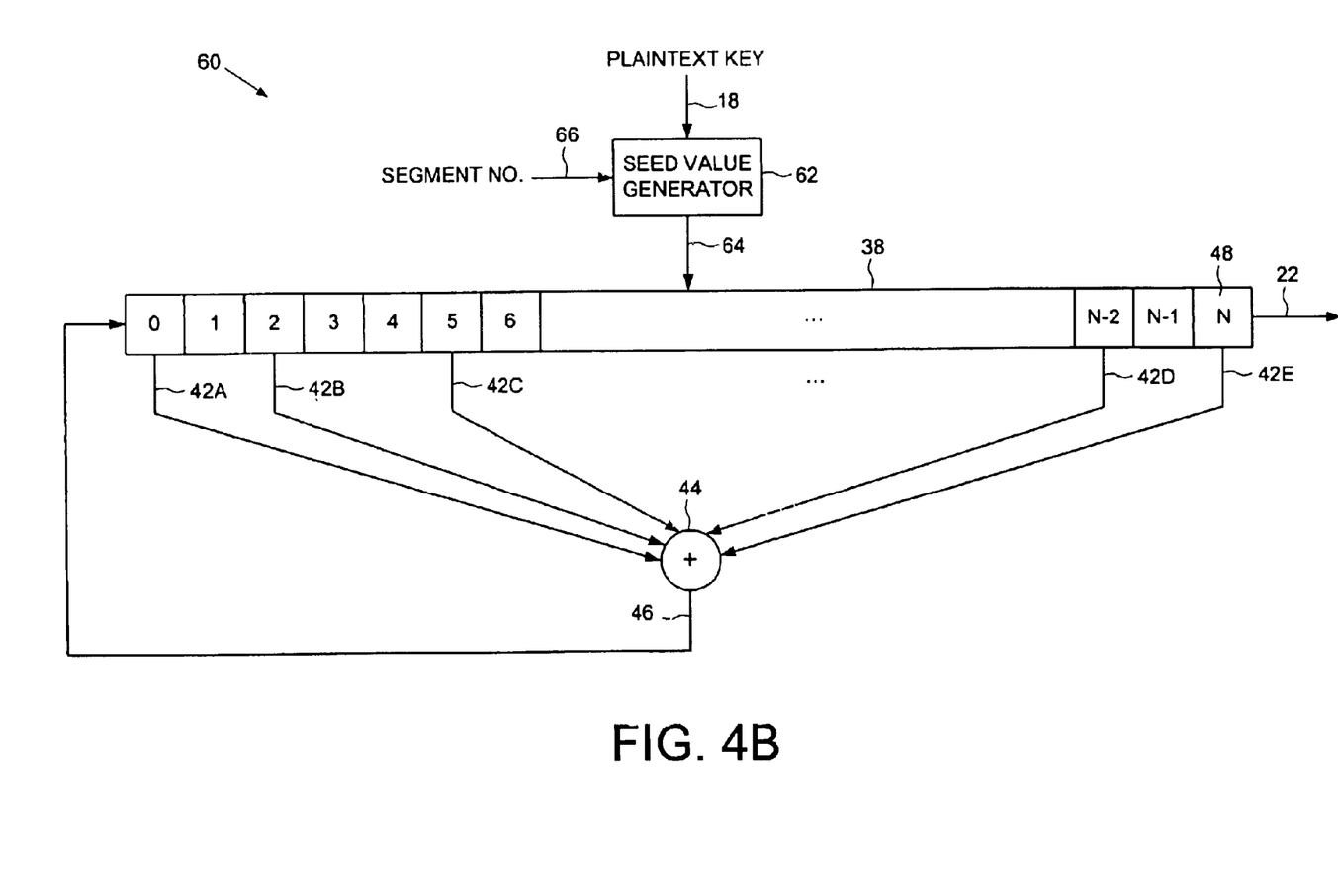
FIG. 4B shows an LFSR for generating a pseudo-random sequence for encrypting a plaintext video program using a plaintext key, wherein a seed value is generated from the plaintext key. In an alternative embodiment, a plurality of segment seed values are generated from the plaintext key wherein each segment seed value is used to encrypt a corresponding segment of the plaintext video program.

FIG. 4B shows an alternative embodiment of the present invention as comprising a programmable LFSR 60 for generating a pseudo-random sequence 22 used to encrypt a plaintext video program into an encrypted video program 8 stored on the HDD 6. A seed value generator 62 generates a seed value 64 used to initialize the shift register 38. The seed value 64 is generated from the plaintext key 18 used to encrypt the plaintext video program. In one embodiment, the plaintext video program is encrypted in segments, and the seed value generator 62 generates a distinct seed value 64 for each segment number 66. Each segment seed value 64 is essentially a distinct key for use in encrypting a corresponding segment of the plaintext video program. In this manner, compromise of a single key enables successful decrypting of only a segment of the encrypted video program. Further, encrypting the video program in segments facilitates trick play features during playback as described above.

In one embodiment, the plaintext key 18 comprises a plurality of segment keys for encrypting each segment of the plaintext video program, and the seed value generator 62 generates a corresponding seed value 64 for each segment key. In another embodiment, the segment keys are computed from the plaintext key 18, and the seed value generator 62 generates a corresponding seed value 64 for each computed segment key. In one embodiment, the seed value generator 62 comprises a function F(x,y) for computing the segment seed values 64 wherein the plaintext key 18 and segment number 66 are the input arguments x and y, and the segment seed value 64 is the result. Lookup tables may also be employed for generating the segment keys, and the algorithm for computing the segment keys may be programmably updated to facilitate different DVR manufactures and to protect against system compromise as described above.

Figure 4C:
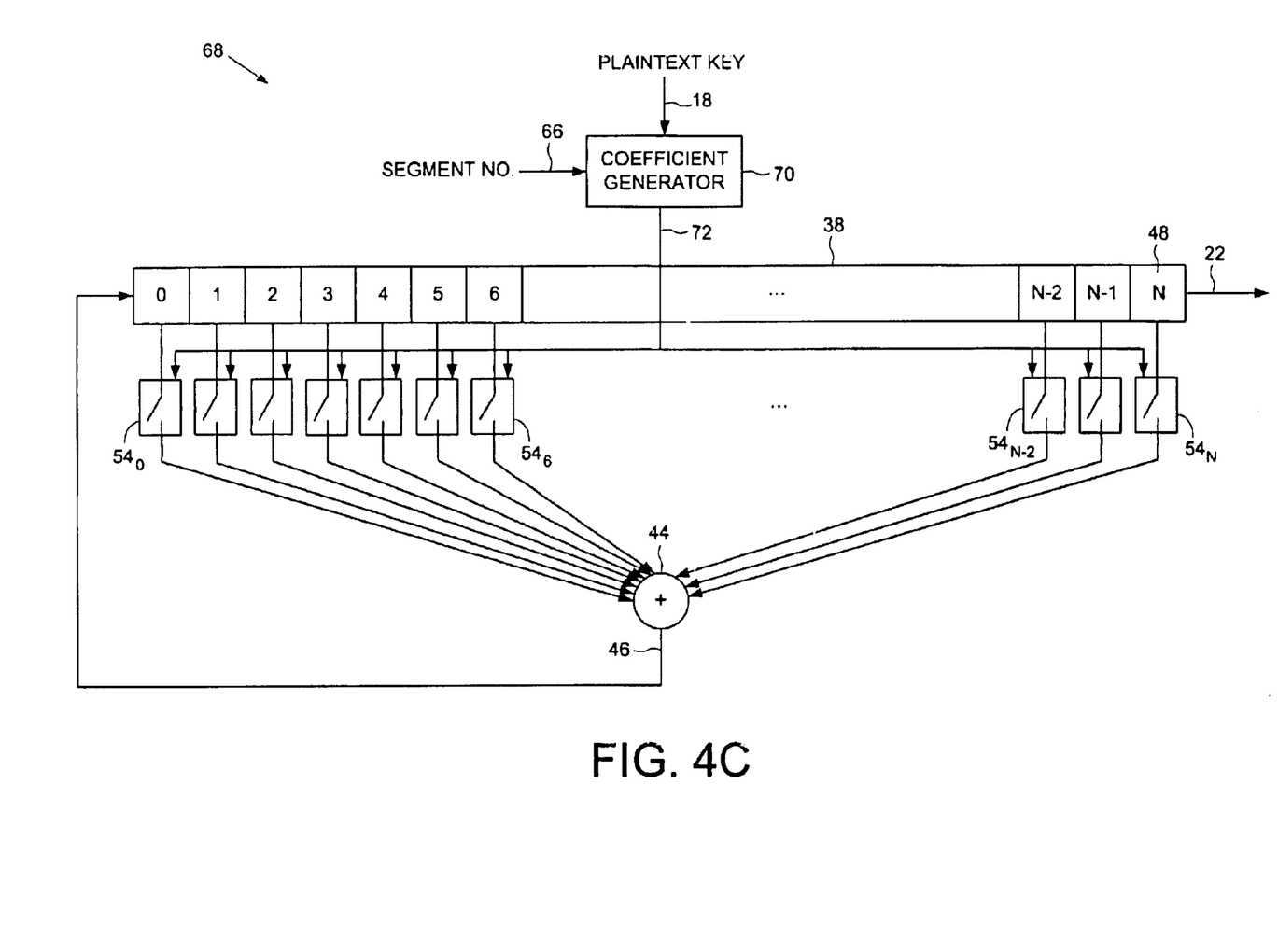
FIG. 4C shows an LFSR for generating a pseudo-random sequence for encrypting a plaintext video program using a plaintext key, wherein coefficient values are generated from the plaintext key. In an alternative embodiment, sets of coefficient values are generated from the plaintext key wherein each set of coefficient values is used to encrypt a corresponding segment of the plaintext video program.

FIG. 4C shows an alternative embodiment of the present invention as comprising a programmable LFSR 68 for generating a pseudo-random sequence 22 used to encode a plaintext video program into an encrypted video program 8 stored on the HDD 6. A coefficient value generator 70 generates a coefficient values 72 used to initialize the coefficients of the LFSR 68. The coefficient values 72 are generated from the plaintext key 18 used to encrypt the plaintext video program. In one embodiment, the plaintext video program is encrypted in segments, and the coefficient value generator 70 generates distinct coefficient values 72 for each segment number 66. Similar to the embodiment of FIG. 4B, each set of coefficient values 72 is essentially a distinct key for use in encrypting a corresponding segment of the plaintext video program so that compromise of a single key enables successful decrypting of only a segment of the encrypted video program. Further, decrypting the video program in segments facilitates trick lay features during playback as described above.

In one embodiment, the plaintext key 18 comprises a plurality of segment keys for encrypting each segment of the plaintext video program, and the coefficient value generator 70 generates a set of coefficient values 72 for each segment key. In another embodiment, the segment keys are computed from the plaintext key 18, and the coefficient value generator 70 generates a corresponding set of coefficient values 72 for each computed segment key. In one embodiment, the coefficient value generator 70 comprises a function f(x,y) for computing the segment coefficient values 72 wherein the plaintext key 18 and segment number 66 are the input arguments x and y, and the segment coefficient values 72 are the result. Lookup tables may also be employed for generating the segment keys, and the algorithm for computing the segment keys may be programmably updated to facilitate different DVR manufactures and to protect against system compromise as described above.

In another embodiment, the LFSR 60 of FIG. 4B or the LFSR 68 of FIG. 4C is used to decrypt an encrypted video program 8 in segments using the segment keys. In one embodiment, the plaintext key 18 comprises a plurality of segment keys which are encrypted and stored as an encrypted file system entry 10 for use in decrypting the encrypted video program 8 during playback. In another embodiment, the plaintext key 18 is encrypted and stored as an encrypted file system entry 10. During playback, the encrypted key is decrypted into the plaintext key 18, and the plaintext key 18 is used to generate the segment keys for use in decrypting the encrypted video program 8 in segments.

In one embodiment, the HDD 6 comprises a disk having a plurality of data tracks, where each data track comprises a plurality of data sectors. In the embodiments of FIGS. 4B and 4C, a segment of a video program corresponds to a data sector. This simplifies the design since data is typically written to and read from a conventional HDD 6 in sector blocks. In one embodiment, the encrypted key for use in decrypting a corresponding sector is stored in the sector.

In another embodiment of the present invention, the unique ID 4 is implemented using tamper and inspection resistant circuitry to protect against discovery. In one embodiment, the host circuitry 12 and unique ID 4 are implemented within an integrated circuit (IC), and the unique ID 4 is buried, scattered or otherwise concealed within the IC using any suitable method. In yet another embodiment, at least part of the cryptography facility 14 (e.g., the seed value generator 62 of FIG. 4B or the coefficient value generator 70 of FIG. 4C) is implemented using tamper and inspection resistant circuitry to protect against discovery. An example of tamper and inspection resistant circuitry is disclosed in Tygar, J. D. and Yee, B. S., "Secure Coprocessors in Electronic Commerce Applications," Proceedings 1995 USENIX Electronic Commerce Workshop, 1995, New York, which is incorporated herein by reference.

The embodiments of the present invention may be implemented in circuitry or software or both. The circuitry and/or software may be static or field programmable as described above. Software embodiments comprise code segments embodied on a computer readable medium, such as a hard disk, floppy disk, compact disk (CD), digital video disk (DVD), or programmable memory (e.g., an EEPROM). The code segments may be embodied on the computer readable medium in any suitable form, such as source code segments, assembly code segments, or executable code segments.

We claim:

1. A digital video recorder for storing a plaintext video program as an encrypted video program, the digital video recorder comprising:
   (a) a random access storage (RAS) device for storing the encrypted video program in encrypted segments;
   (b) a cryptography facility comprising:
      an encoder for encrypting plaintext segments of the plaintext video program into the encrypted segments stored on the RAS device; and
      a decoder for randomly and independently decrypting each encrypted segment of the encrypted video program into a plaintext segment during playback.

2. The digital video recorder as recited in claim 1, wherein the cryptography facility further comprises a pseudo-random sequence generator for generating a pseudo-random sequence.

3. The digital video recorder as recited in claim 2, wherein:
   (a) the pseudo-random sequence generator is initialized with segment seed values corresponding to the plaintext segments of the plaintext video program; and
   (b) the encoder combines the pseudo-random sequence generated for each segment seed, value with the plaintext segments of the plaintext video program to generate the encrypted segments of the encrypted video program stored on the RAS device.

4. The digital video recorder as recited in claim 2, wherein:
   (a) the pseudo-random sequence generator is initialized with segment seed values corresponding to the encrypted segments of the encrypted video program; and
   (b) the decoder combines the pseudo-random sequence generated for each segment seed value with the encrypted segments of the encrypted video program to generate the plaintext segments of the plaintext video program during playback.

5. The digital video recorder as recited in claim 2, wherein:
   (a) the pseudo-random sequence generator comprises a linear feedback shift register (LFSR); and
   (b) the LFSR is initialized with segment seed values corresponding to the plaintext segments of the plaintext video program during encoding, and with segment seed values corresponding to the encrypted segments of the encrypted video program during decoding.

6. The digital video recorder as recited in claim 5, further comprising a seed value generator for generating the segment seed values from an initial value.

7. The digital video recorder as recited in claim 1, wherein:
   (a) the RAS device comprises a hard disk drive (HDD) comprising a disk;
   (b) the disk comprises a plurality of data tracks;
   (c) ach track comprises a plurality of data sectors; and
   (d) each data sector stores an encrypted segment of the encrypted video program.

8. A method for processing a video program in a digital video recorder comprising a random access storage (RAS) device, the method comprising the steps of:
   (a) encrypting plaintext segments of a plaintext video program into encrypted segments;
   (b) storing the encrypted segments on the RAS device;
   (c) randomly reading the encrypted segments from the RAS device; and
   (d) independently decrypting each encrypted segment into a plaintext segment.

9. The method for processing a video program as recited in claim 8, further comprising the step of generating a pseudo-random sequence using a pseudo-random sequence generator.

10. The method for processing a video program as recited in claim 9, further comprising the steps of:
    (a) initializing the pseudo-random sequence generator with segment seed values corresponding to the plaintext segments of the plaintext video program; and
    (b) combining the pseudo-random sequence generated for each segment seed value with the plaintext segments of the plaintext video program to generate the encrypted segments of the encrypted video program stored on the RAS device.

11. The method for processing a video program as recited in claim 9, further comprising the step of:
    (a) initializing the pseudo-random sequence generator with segment seed values corresponding to the encrypted segments of the encrypted video program; and
    (b) combining the pseudo-random sequence generated for each segment seed value with the encrypted segments of the encrypted video program to generate the plaintext segments of the plaintext video program.

12. The method for processing a video program as recited in claim 9, wherein:
    (a) the pseudo-random sequence generator comprises a linear feedback shift register (LFSR); and
    (b) the LFSR is initialized with segment seed values corresponding to the plaintext segments of the plaintext video program during encoding, and with segment seed values corresponding to the encrypted segments of the encrypted video program during decoding.

13. The method for processing a video program as recited in claim 12, further comprising the step of generating the segment seed values from an initial value.

14. The method for processing a video program as recited in claim 8, wherein:
  (a) the RAS device comprises a hard disk drive (HDD) comprising a disk;
  (b) the disk comprises a plurality of data tracks;
  (c) each track comprises a plurality of data sectors; and each data sector stores an encrypted segment of the encrypted video program.

* * * * *